United States Patent

[11] 3,612,282

[72] Inventor Sing-Wang Cheng
 c/o Dr. Chen-Yen Cheng 3555 E. Evans Ave., Denver, Colo. 80210
[21] Appl. No. 850,135
[22] Filed Aug. 14, 1969
[45] Patented Oct. 12, 1971

[54] SUPPORTING STRUCTURES AND CONTAINING VESSELS FOR REVERSE OSMOSIS AND FILTRATION
11 Claims, 20 Drawing Figs.

[52] U.S. Cl. .................................................... 210/321, 210/433, 210/490, 210/500
[51] Int. Cl. .................................................... B01d 31/00
[50] Field of Search ........................................... 210/22, 23, 321, 490, 500, 433, 541, 335, 336, 323

[56] References Cited
UNITED STATES PATENTS
3,392,840 7/1968 Clark et al. ............... 210/496 X
3,442,389 5/1969 Mendelson ............... 210/491 X
3,485,374 12/1969 Manjikian et al. ............. 210/323 X
3,498,909 3/1970 Littman ...................... 210/321 X OTHER REFERENCES
" Process and Configuration Development for Tubular Reverse Osmosis Units," Office of Saline Water Research and Development Progress Report No. 426, for sale by Supt. of Documents, received in U.S. Pat. Office, July 18, 1969, 92 pages, pp. 91 and 92 relied on.

Primary Examiner—Frank A. Spear, Jr.

ABSTRACT: A reverse osmosis separator unit having many small composite membrane tubes 0.5 mm. to 5 mm. O.D. placed together in a membrane tube assembly. Several membrane tube assemblies are installed in a honeycomb pressure vessel to form a separator unit. A small membrane supporting tube is made by forming either a strip of solid sheet material which may or may not be perforated or a strip of porous sheet material. The seam of the formed tube, the perforations and the pores serve as intermediate passages for collecting product water into the supporting tube.

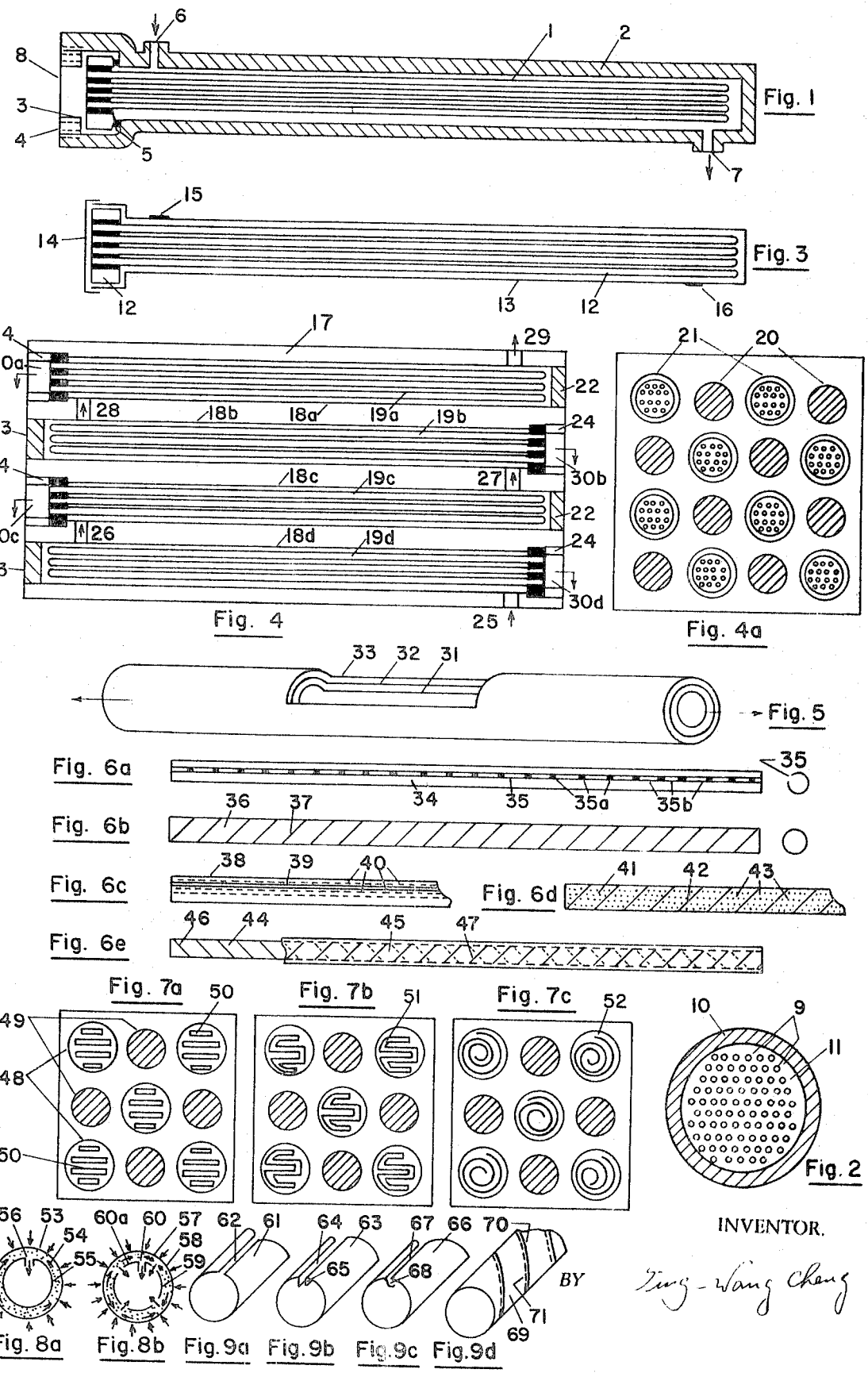

SUPPORTING STRUCTURES AND CONTAINING VESSELS FOR REVERSE OSMOSIS AND FILTRATION

This invention is related to the design, fabrication and construction of a reverse osmosis separator unit and a filtration unit. The primary objective of the invention is to provide a small membrane tube assembly and a small filter tube assembly which can be installed in a containing vessel at a high-packing density and can be installed and replaced with ease. A further objective is to provide a low-cost containing vessel and a way of installing tube assemblies in it so that a tube assembly which is not functioning properly can be easily isolated from the operation. In case of a reverse osmosis separator unit, farther objectives are to attain a high-water flux through the membrane tubes and to provide an efficient membrane fabrication technique. Most of the following discussions will be made by referring to reverse osmosis separator units. It should be understood, however, that similar supporting assemblies and containing vessels can be used for filtration operations.

FIG. 1 shows a reverse osmosis separator unit consisting of a one-conduit pressure vessel and a small composite membrane tube assembly. FIG. 2 shows the head of a membrane tube assembly and illustrates the way of potting membrane tubes. FIG. 3 shows a membrane tube assembly enclosed in a cartridge for storage and transportation. FIG. 4 shows a reverse osmosis separator unit having several membrane tube assemblies installed in the straight conduits of a honeycomb pressure vessel. FIG. 5 shows the detail of a small composite membrane tube. FIGS. 6a, 6b, 6c, 6d and 6e show various small membrane-supporting tubes. FIGS. 7a, 7b, and 7c show how honeycomb pressure vessels may be used to contain membrane assemblies of various designs. FIGS. 8a and 8b illustrate how fresh water permeates through a dense membrane layer, flows through a porous substrate layer and finally is collected into a membrane-supporting tube. FIG. 9a, 9b, 9c and 9d, then, show the details of various membrane-supporting tubes.

Because of its simplicity and the potential low-energy requirement, reverse osmosis has been drawing widespread attention as a way of separating fresh water from an aqueous solution. The design of a reverse osmosis separator unit must be judged on the basis of its effect on total water costs. In the practical design of separator units, the following factors have to be taken into consideration: (a) capital cost; (b) scaleup potential; (c) ease of membrane installation and replacement; (d) membrane-packing density; (e) ease of isolation of a membrane module or submodule that no longer produce quality water; and (f) effective isolation of the brine and product stream. A basic unit in a reverse osmosis separator contains component parts to meet the following functional requirements: (1) a conduit means for brine flow; (2) a thin dense membrane layer which really does the desalination job; (3) one or more porous substrate layers for supporting the thin dense membrane layer and at the same time providing intermediate passage means for product water; (4) a conduit means for collecting product water from the porous substrate layers and discharging it; and (5) a mechanical support to withstand the pressure differential of a reverse osmosis operation. In operation, a feed brine under a high-applied pressure passes through the brine conduit, fresh water permeates through the thin dense layer while the solutes is withheld within the brine conduit. The fresh water then flows through the porous substrate layers and is collected into the product water conduit and discharged from it. In practice, two or more of the functional requirements may be integrated into one part. For example, in the Loeb-Sourirajan-type membrane, a thin dense membrane layer and a porous substrate layer are integrated. Other ways of integrating various functional parts are possible.

Geometrically, reverse osmosis separators may be classified into the following types: (1) flat membrane type; (2) spiral-wound module type; and (3) tubular type. The tubular type has conventionally been classified into (a) large diameter tube type; and (b) hollow fiber type. In a tubular design, brine may either flow outside or inside of the membrane tubes. In the former case, brine flows outside of the membrane tubes and product water is collected within the tubes; in the latter case, brine flows inside of the membrane tubes and product water is collected outside of the membrane tubes. The former and the latter cases will be respectively referred to as the outside-type operation and inside-type operation. The composite small membrane tube concept of the present invention represents an intermediate compromise between the hollow fiber concept and the large diameter tube concept. A small composite membrane tube assembly is to be operated by the outside-type operation.

In order to clearly distinguish the composite small tube concept of the present invention from the conventional approaches, the conventional designs are briefly reviewed. These designs are described in details in the following (1) (1,) "Desalination by Reverse Osmosis," chapters 6 and 7, edited by Ulrich Merten, M.I.T. Press., 1966; and (2) 1968 Saline Water Conversion Report, Office of Saline Water, Department of Interior. These designs are:

a. Flat Membrane Type

Plate and frame design of Aero-jet General Corp., permeator design of Union Carbide Corp., narrow channel design of Dorr-Oliver Co., compact cartridge design of Pratt and Whitney Co., belong to this category. In these designs, flat membranes are stacked together with flat membrane support plates with or without cushion layers and are properly sealed between two successive layers. Membrane-packing density has been reported as 100–500 ft.$^2$/ft.$^3$ High-flux membrane can be used in these designs.

The main disadvantages of these designs are, (1) it is impossible to isolate a membrane which is not producing quality water; (2) in some of these designs, manual labor required in the assembly and membrane replacement is high.

b. Spiral-Wound Module

This concept has been developed at the Gulf General Atomic, Inc. In this design, a piece of flat membrane is folded over a porous product waterside-backing material and a tube is placed between the two layers at the fold. The resulting sandwich is then sealed along both sides and one end as well as around the central tube where the tube leaves the sandwich. The central tube wall has perforations in the area between the glue regions. This unit is then simply rolled up by wrapping the leaf around the tube. Before rollup, a highly porous brine-side spacer screen is placed on one membrane surface so that, as the assembly is rolled, adjacent brine-side surfaces are spaced apart. The rolled-up unit, called a module, is then placed in a pressure tube, generally a piece of pipe, and sealed between the outer wrap of the module and the inside of the pipe to prevent short circuit flow of the brine around the module during operation.

A precast Loeb-Sourirajan-type high-flux membrane has been used in separators of this design and water flux of 20 gallons/day-ft.$^2$ has been reported for brackish water desalination. This concept has the advantage of providing a relatively large membrane-packing density of between 250 and 500 ft.$^2$/ft.$^3$ and a controlled brine-side spacing. The design lends itself to factory assembly and easy field replacement of lightweight units. Its disadvantages lie in the need for the product water to flow appreciable distances in a porous medium before it can be removed from the module and it is unable to isolate a membrane module that no longer produces quality water.

C. Large tube

This approach utilizes a porous wall tube with the membrane on the inside wall either cast in place or precast and inserted. The porous tube either can be supported by an outer tube or can be its own pressure tube. Brine flow is axial inside the tube. Product water flow is through the membrane, to an outlet hole in the supporting tube wall and then through the porous wall. The water emerges at near-atmospheric pressure. In one embodiment of this arrangement, first reported by Havens Industries, the porous support tube is of glass-fiber-reinforced epoxy. Loeb and his coworkers in UCLA reported on a similar unit using 1-inch diameter copper tubes with small holes drilled 3 inches apart in the tube wall.

Leob-Sourirajan-type high-flux membrane has been used in a separator of this design and this concept has several advantages: The porous support wall can serve simultaneously as the pressure-containing unit, the brine flow passage geometry is cylindrical and well defined, and filtration requirements are minimal. The principal disadvantages of this approach are in the cost of the tubes and in the large number of individual tubes that must be handled. Furthermore, the method of membrane replacement has not been clarified, and it is unable to isolate a membrane tube that no longer produces quality water. Membrane-packing density is 10 to 200 ft.$^2$/ft.$^3$ d. Small tube This approach utilizes small hollow fibers or small diameter tubes, where the walls of the tube serve both as the membrane material and the pressure-containing unit. The most common sizes are in the range of 25 to 250 microns outside diameter, with wall thicknesses of 5 to 50 microns. The fibers are potted in a special epoxy resin which serves as the tube sheet. The brine flow can be inside or outside of the tubes. In one design, a shell and tube configuration similar to a single end heat exchanger is adopted. Brine enters the shell side near the head and flows through the outside of the fibers and the reject brine stream exits from the other end. Fresh water permeates through the fibers and flows through the inside of the fibers and collected from the head. Work has been reported only for dense cellulose acetate and nylon membranes.

The main advantage of this approach is the extremely high-membrane-packing density—membrane-packing density of 5,000 to 20,000 ft.$^2$/ft.$^3$ has been reported. One of the main disadvantages is that the manufacturers have been unable to spin hollow fiber high-flux membrane—the water flux reported for the hollow fibers has been in the order of 0.15 gal./ft.$^2$/ay as compared with 20 gal./ft.$^2$/day for a high-flux membrane. Another main disadvantage is the ineffective use of the membrane material. The strength of membrane materials is lower than that of a common structural material and the price is higher. Therefore, this approach of using the membrane tube itself to sustain the pressure differential of a reverse osmosis process does not represent an effective use of the membrane material. It will be of interest to note that the cost of the hollow membrane fibers has been quoted as high as $10 per pound. Furthermore, it should be mentioned that with the present relatively thick-walled hollow fibers, the use of the hollow fiber membrane is restricted to a relatively low system pressure (700 p.s.i.g.) and it cannot be used under the high pressure required in the sea water desalination (1,500 p.s.i.).

Two designs which represent intermediate compromises between the hollow fiber and large diameter tubular concepts have been introduced. Battelle-Columbus Laboratories is developing a module concept using small diameter, one-eighth inch to one-fourth inch, thin wall, metallic, porous membrane support structure and propose to use a cold-binder extrusion step, followed by a sintering step to obtain porous-membrane-supporting tubes. In the cold-binder extrusion process, a metal powder is mixed with suitable binder material such as polyethylene, polystyrene or polyisobutylene. Hydronautics, Inc., is studying the so-called hydroforming method, in which a membrane tube of controlled thickness can be continuously formed within a porous support tube by forcing a plug of cellulose acetate/acetone solution through the tube by means of a suitable forming fluid, followed by a column of water which coagulates the cellulose acetate. The membrane tube of this design is intended for inside-type operation.

The present invention is to innovate the design, fabrication and construction of a reverse osmosis separator unit. In effect, it takes the advantages of the various approaches and removes their disadvantages. It has been an ideal goal for the scientists and engineers in the reverse osmosis field to come up with a design which enable us to obtain a packing density approaching that of the small tube design, say 1,000 to 10,000 ft.$^2$/ft.$^3$, to obtain a water flux comparable to or exceeding that of the high-flux Loeb-Sourirajan-type membrane (20 gal./day ft.$^2$) and to obtain the ease of membrane replacement and installation comparable to or better than that of the spiral wound module. The present scheme comes close to this ideal goal and has other additional advantages.

Three major concepts are introduced in the present design: viz. small composite tube concept, cartridged membrane assembly concept and honeycomb pressure vessel concept. The small composite tube concept contributes to low-membrane tube cost, high-membrane packing density and high-water flux. The cartridged membrane tube assembly concept enables factory assembly and easy membrane installation and replacement. Due to the honeycomb pressure vessel concept, the pressure vessel can be manufactured by an extrusion process at a very low cost and with very little finishing operation. The last concept, furthermore, contributes to the ease in isolating a membrane tube assembly which is not producing quality water.

The essential features of the present invention can be summarized as relating to (1) design and fabrication of small composite membrane tubes; (2) design and construction of membrane tube assemblies; (3) storage and handling of membrane tube assemblies; and (4) construction and operation of a membrane separator unit. Of these items, the first item is the most basic and requires a rather detailed description. Therefore, the last three items will first be described in the following paragraphs and the first item will be described in later paragraphs. Suffice it here to say that small composite membrane tubes have 0.5 mm. to 5 mm. O.D. and have a high-water flux.

FIG. 1 shows a membrane separator unit consisting of a small composite membrane tube assembly 1 and a one-conduit high-pressure vessel 2. The membrane tube assembly has a header plate 3 and is fixed in place by a threaded ring 4 and is sealed against the containing vessel by an O-ring 5. The tube assembly can also be fixed in place by any of the schemes used in installing oil caps and gas caps to a hydraulic accumulator body. The construction of a membrane tube assembly will be described shortly. In operation, a brine feed under a high-applied pressure enters port 6, passes outside of the membrane tubes within the vessel and the reject brine is discharged from port 7. Fresh water permeates through the membrane, passes inside the membrane tubes and is discharged from the header 8. Referring to FIG. 2, small composite membrane tubes 9 to be described are potted together with a metal ring 10 in a special epoxy resin 11 to form a membrane tube assembly. Small composite membrane tubes and tube assemblies can be factory fabricated.

Referring to FIG. 3, a finished membrane tube assembly 12 is enclosed in a thin container made of metal, plastic or impregnated paper. The thin container consists of a tubular part 13 and a cover cap 14. In this enclosed form, a membrane tube assembly can be protected from drying out and be protected from other damages during storage and handling. The optimum outside diameter of a tube assembly is probably between 1 inch to 3 inches for easy handling. In installing a membrane tube assembly into a containing vessel, the tubular part of the thin container 13 may either be left with the assembly or removed from it. The former approach is preferable. In the former case, two openings are made just before installation at proper positions on the container surface 15 and 16 to admit brine feed to the tube assembly and to discharge the reject brine from the unit. These openings can be made in a way similar to that used in aluminum cans for beers and soft drinks. In this cartridge form, membrane installation and replacement can be accomplished with great ease. In installing a membrane tube assembly, we simply, remove cover cap 14, install an O-ring 5, make two openings 15 and 16 on the container 13, insert the membrane tube assembly in a containing vessel 2 so that the openings 15 and 16 come to the positions of ports 6 and 7 respectively and then set the threaded ring 4 in place.

FIGS. 4 and 4a show a membrane separator unit consisting of a honeycomb pressure vessel 17 with many conduits 18a, 18b, 18c, 18d, and a number of membrane tube assemblies 19a, 19b, 19c, 19d to match with the number of the conduits. The conduits are classified into two groups 20, 21. In the conduits of the first group 20, membrane tube assemblies are inserted from the left-hand end and the conduits are simply plugged at the right-hand end 22. Conversely, in the conduits of the other group 21, membrane tubes are inserted from the right-hand end and the conduits are plugged off at the left-hand end 23. The tube assemblies are held in place by threaded rings 24. In operation, a feed brine under a high pressure is introduced at port 25, passes through a series of conduits and connecting passes 18d, 26, 18c, 27, 18b, 28, 18a and is discharged from port 29. Fresh water permeates through the membranes tubes, passes inside the tubes and is finally discharged at the headers 30a, 30b, 30c, 30d. A honeycomb pressure vessel can be made by an extrusion operation and requires minimum amount of fabrication. For example, it may be made by extrusion of a high-strength aluminum alloy such as 6061-T6. The present invention should not be limited to the material used in the manufacture of the pressure vessel. Some of the advantages of this honeycomb design are: (1) small size conduits can be provided at low cost; (2) minimum fabrication is needed; and (3) tube connectors required in the conventional large tube approach are not needed.

Another important advantage of this approach is that a membrane tube assembly that does not produce quality water can be easily isolated and put out of operation. For example, by referring to FIG. 4, if a tube assembly, say 19c, is not functioning properly, we can find it out by checking the quality of water coming out from the header 30c, and isolate the tube assembly out of operation by simply plugging off the header 30c. After plugging off the header, brine simply flows through the malfunctioning conduit and the rest of the tube assemblies can still be kept in operation. Furthermore, it is also possible to pinpoint a malfunctioning individual tube by either noticing the change in the flow condition or by checking the quality of water coming out of each tube within a malfunctioning assembly. It is then possible to plug off the malfunctioning tube and keep the tube assembly in operation. This enables us to reduce shutdown time.

It should be emphasized that honeycomb pressure vessels may be used to contain other types of membrane assemblies. FIGS. 7a, 7b and 7c respectively show how flat membrane assemblies 50, folded membrane assemblies 51 and spiral membrane assemblies 52 may be installed in the straight conduits 48, 49 of a honeycomb pressure vessel to form a membrane separator unit. In summary, we can say in general that the honeycomb pressure vessel concept facilitates membrane installation and replacement operations and reduces shutdown time by enabling us to isolate a malfunctioning membrane assembly.

The small composite membrane tube concept of this invention may be considered as an approach embodying the advantageous features of both the conventional hollow fiber approach and the conventional large tube approach. Therefore, this new approach can best be introduced by analyzing the advantages and disadvantages of the two conventional approaches and by showing how these disadvantages can be removed. The high-membrane packing density of the hollow fiber concept is a definite advantage. This approach however suffers from two main disadvantages: (1) low-water flux, and (2) high-membrane cost. The large tube approach can use high-flux membrane but has a rather low-membrane packing density. Therefore, it will be an ideal combination to have the high-water flux of the large tube approach and the high-membrane packing density of the hollow fiber approach. High-flux membrane is obtained by a special fabrication technique developed by Loeb and Sourirajan. In the process, the casting solution used is specially formulated and the casting procedures are specially designed so that the membrane formed consists of a thin, dense layer of membrane material and a porous substrate layer. Successful casting has been made only on a smooth solid surface. The dense layer is responsible for the salt rejection and the porous layer provides intermediate passages for product water and at the same provides mechanical support for the dense membrane layer. We have been unable to produce hollow fiber with high-water flux, because the spinning operation for the manufacture of hollow fibers cannot take the special casting solution and the special casting procedures required in the production of high-flux membrane. The small composite membrane tube concept of the present invention is to overcome this difficulty and to come up with a low-cost high-water flux small membrane tube.

FIG. 5 illustrates a small composite membrane tube which is of 0.5 mm. to 5 mm. O.D. It consists of a membrane-supporting tube 31, a porous substrate layer 32 and a dense membrane layer 33. The membrane-supporting tube is to be made of a sheet material which may either be a solid sheet material, such as a metal strip and a plastic strip, or a porous sheet material, such as a porous plastic strip or a pretreated paper strip. The solid sheet material used may or may not be perforated. After a strip of the sheet materials is made into a tube by a proper forming operation, the pores in the porous sheet, the perforations in the solid sheet material and the seams left in the forming operation become radial passages for collecting product fresh water into the membrane-supporting tube. In an actual operation, an aqueous solution under a high pressure is passed outside of a composite membrane tube. Water permeates through the dense membrane layer 33, flows through the porous substrate layer 32, and through the radial passages of the supporting tube 31 and is collected into the tube and discharged from one or both of its ends.

FIGS. 6a–6e show various types of membrane-supporting tubes to be used. FIG. 6a shows a supporting tube 34 with a longitudinal slit 35. It can be manufactured by a forming operation from a strip of metal, plastic of specially treated paper. If it is desired to increase its supporting strength, the slit may be welded, brazed, or otherwise bound together by an adhesive 35a at a regular interval from inside. This is conveniently done during the forming operation. The slit opening 35b serve as the radial passage for collecting fresh water into the supporting tube. FIG. 6b shows a membrane-supporting tube 36 with a spiral slit 37. It can be manufactured by a spiral-winding operation from a strip of metal, plastic or specially treated paper. Again the slit opening serves as the radial passage for collecting fresh water into the supporting tube and the spiral slit may be bound together at a regular interval to increase its supporting strength. It may, however, be more convenient and economical to use a heavier material in the manufacture and omit the binding steps for both the longitudinal and spiral slits. We may also use a perforated strip in forming a supporting tube. Then the resulting supporting tube will have many perforations along with the slits to serve as the radial passages for collecting fresh water. FIG. 6c shows a supporting tube 38 with a longitudinal slit 39 and perforations 40 and FIG. 6d shows another supporting tube 41 which has a spiral slit 42 and perforations 43. When a porous sheet material is used, two or more strips may be used so as to form a multilayer tube. FIG. 6e shows a supporting tube consisting of two layers of porous strips 44 and 45. The seams in the two layers 46, 47 are also shown. The membrane-supporting tubes of the present invention should be distinguished from the supporting tube which is under development by Battelle-Columbus Laboratories. While supporting tube of the present invention is to be made of a sheet material by a forming operation, a supporting tube of Battelle-Columbus Laboratories is to be made of metal powder by a cold extrusion process.

FIG. 8a and 8b show cross sections of small composite membrane tubes. The membrane-supporting tube shown in FIG. 8a is not perforated and the supporting tube shown in FIG. 8b is perforated. Referring to FIG. 8a, the membrane tube consists of a dense membrane layer 53, a porous substrate layer 54 and a membrane-supporting tube 55 which has a slit opening 56. The membrane tube shown in FIG. 8b consists of a dense layer 57, a porous substrate layer 58 and a perforated supporting tube 59 which has a slit opening 60 and perforations 60a. As has been described, in each of these tubes, fresh water permeates through the dense layer, flows through the porous substrate layer and is collected into the supporting tube. The porous substrate layer serves the double purposes of providing mechanical support for the dense membrane layer and intermediate water passage. Since the size of the membrane tube of the present invention is small, 0.5 mm. to 5 mm. O.D., the distance of travel of fresh water through the intermediate passage is small. Therefore, the porous substrate layer used may be thinner and may have a lower permeability without adding excessive resistance to fresh water flow. This thinness and the low permeability of the substrate layer contribute to overcoming the so-called membrane compaction problem and enable the membrane tube to be used under a higher applied pressure as compared with the conventional designs. The porous substrate layer and the dense membrane layer may be applied as an integrated layer, or a porous substrate layer may be precasted and another layer which contains a dense membrane film may be applied on its top.

The cost of the membrane-supporting tube is a very important factor to the economy of a reverse osmosis separating unit. As has been described, one of the characteristic features of the present invention is to manufacture a membrane-supporting tube by forming a sheet material, either a solid sheet or a porous sheet. The cost of small diameter, membrane-supporting tube manufactured by the present invention is believed to be lower than the porous small tube manufactured by the cold extrusion process of Battelle-Columbus Laboratories.

As has been described, a sheet material, in a strip form, may be formed into a small tube with a longitudinal seam or a spiral seam. FIG. 9a shows a small tube 61 with a simple longitudinal seam 62. FIG. 9b shows a small tube 63 with a longitudinal seam which has bends 65 into the tube. When the tube is under an external pressure a portion of the bended wings 65 touch each other and therefore contribute to the compression strength. FIG. 9c shows a small tube 66 with a longitudinal seam 67 and is provided with a longitudinal pocket 68. This pocket is useful in the direct casting of a substrate layer or an integrated membrane layer. The pocket helps to prevent membrane-casting solution from entering the membrane-supporting tube. The pocket 68 may be reduced to become a simple overlap layer. FIG. 9d shows a small tube 69 with a spiral seam 70 which has a overlap layer 71 along the spiral seam.

It has been described that a small composite membrane tube of the present invention consists of a small membrane-supporting tube, a porous substrate layer and a dense membrane layer. Due to the smallness of the membrane tube, direct casting is probably the best way of laying the porous substrate layer and the dense membrane layer on a membrane-supporting tube. These layers may be applied in one or more casting operations. It has been described that a membrane-supporting tube of the present design is made of a sheet material in a strip form by a forming operation and the resulting membrane-supporting tube contains small openings such as forming seams and other perforations which provide radial passages for collecting product water into the membrane-supporting tube conduit. Therefore, in a direct casting operation, there is a tendency for the casting solution to penetrate through the openings and enter the membrane-supporting tube conduit. This penetration of casting solution through the openings should be prevented as far as possible, in order to keep the tube conduit from being plugged up. This penetration of casting solution through the supporting tube openings can be prevented in two ways. They Are:

1. By using a high-viscosity casting solution and by casting at a high-linear speed, the penetration of casting solution can be minimized.

2. We may first fill the openings of a membrane-supporting tube by a filling material, apply a casting solution on the filled supporting tube and then remove the filling material. This approach will simply be referred to as the pore-filling approach. We may either fill the openings only or fill both the tube conduit and the openings.

The second approach, viz. the pore-filling approach, requires further discussion. A filling material used should be such that a membrane-supporting tube which is properly filled with it would provide adequate backing surface for the casting operation. Furthermore, the filling material should be easily removable from the supporting tube in a subsequent operation after membrane-casting operation. For example, it may be removed either by melting or by leaching with water. It is certainly convenient that the filling material used can be removed in a subsequent step of the regular casting technique used. Therefore, the filling material used should be selected to match with the casting solution and the casting technique to be used. For example, if Loeb-Sourirajan-type casting solution and casting technique are used, water and hydrophilic polymer material, such as polyvinyl alcohol, carboxymethylcellulose, and other water soluble gums, will be convenient filling materials.

Water occupies a very special position in being a convenient filling material when casting operation is conducted at a temperature lower than the melting point of ice. A membrane-supporting tube is first immersed in water which may be modified by addition of some hydrophilic polymer, followed by a wiping operation to remove excess water from the tube. Water then fills both the tube conduit and the openings. The resulting water-filled tube is cooled to freeze water into ice, a casting solution is then directly applied to the ice-filled supporting tube. The ice is melted and removed in a subsequent step.

Polyvinyl alcohol is also a convenient filling material, because polyvinyl alcohol is commercially available in various grades depending on the molecular weight and degree of hydrolysis. Water solubility, viscosity and film hardness can be tailored to suit both the filling operation and the later removal operation.

By referring to the Loeb-Sourirajan casting technique, the ways by which the filling of supporting tube openings and the later removal of filling agent can be accomplished can be illustrated. In the original Loeb-Sourirajan formulation, the casting solution used is a quaternary mixture of cellulose acetate, magnesium perchlorate, water and acetone in the proportion 22.2–1.1–10.0–66.7 weight percent. The casting procedures consist of the following steps:

1. membrane casting at $-5°$ to $-10°$ C.,
2. evaporation of some solvent from the casted surface,
3. immersion of casted membrane in cold water for an hour,
4. curing of the resulting membrane at $65°$ to $85°$ C. for 5 minutes. When water is used as the filling material, a membrane tube is immersed in water and excess water is wiped up so that water fills the tube conduit and the openings. The water-filled tube is cooled to freeze the water. The tube then become ice-filled. The casting solution is directly applied on the ice-filled supporting tube. The filling ice can be removed either in the immersion step or the curing step described above. When a hydrophilic polymer material is used, it may either be applied as a melt or as an aqueous solution. Since such a polymer melt or solution may be rather viscous, it may be applied to supporting tubes just to fill the openings without filling the tube conduit. The polymer-filled supporting tube is then directly coated with membrane casting solution. The filling material is removed in the immersion and the curing steps described.

The pore-filling approach described above can be modified and leads to a way of manufacturing high-flux unsupported small membrane tubes. It has been described earlier that we have been unable to obtain high-flux hollow membrane fiber because the conventional ways of spinning hollow fibers do not take the casting solution and the casting techniques used in the manufacture of high-flux membrane. A casting solution of Loeb-Sourirajan-type has only been successfully casted on a solid surface. High-flux hollow membrane can be made in the following way:

1. Prepare small-diameter filaments of either a low-melting material or a water soluble polymer material.
2. Cast a high-flux membrane on the filament.
3. Remove the core filament by either a melting operation or a leaching operation.

What I claim as my invention and desire to secure by Letter Patent is:

1. a reverse osmosis separator unit comprising at least one semipermeable membrane supported on a support tube, said support tube having an outside diameter between 0.5 mm. to 5 mm., said support tube being so constructed and arranged from sheet material that there results at least one slit opening therein to provide passage means for collecting product water into the support tube.

2. A reverse osmosis separator unit of claim 1, wherein the said slit opening is jointed together at intervals.

3. A reverse osmosis separator unit of claim 1, wherein the said support tube being so constructed and arranged that at least a wing is formed along the said slit opening.

4. A reverse osmosis separator unit of claim 1, wherein the said support tube being so constructed and arranged that at least a pocket is formed along the said slit opening.

5. A reverse osmosis separator unit of claim 1, wherein the said sheet material has perforations on it.

6. A reverse osmosis separator unit of claim 1, wherein the said sheet material is a porous material.

7. A membrane tube for a reverse osmosis separation process consisting of a semipermeable membrane and a support tube for supporting the said semipermeable membrane, said support tube having an outside diameter between 0.5 mm. to 5 mm., said support tube being so constructed and arranged from sheet material that there results a continuous seam with at least an opening to provide passage means of collecting product water into the support tube.

8. A membrane tube of claim 7, wherein the said support tube being so constructed and arranged that at least a wing is formed along the said seam.

9. A membrane tube of claim 7, wherein the said support tube being so constructed and arranged that at least a pocket is formed along the said seam.

10. A membrane tube of claim 7, wherein the said sheet material has perforations on it.

11. A membrane tube of claim 7, wherein the said sheet material is a porous material.